(12) United States Patent
Stenlåås et al.

(10) Patent No.: US 9,657,667 B2
(45) Date of Patent: May 23, 2017

(54) REGULATION OF A TEMPERATURE IN AN EXHAUST AFTERTREATMENT SYSTEM

(71) Applicant: Scania CV AB, Södertälje (SE)

(72) Inventors: Ola Stenlåås, Södertälje (SE); Fredrik Roos, Segeltorp (SE)

(73) Assignee: SCANIA CV AB (SE)

(*) Notice: Subject to any disclaimer, the term of this patent is extended or adjusted under 35 U.S.C. 154(b) by 180 days.

(21) Appl. No.: 14/433,274

(22) PCT Filed: Oct. 2, 2013

(86) PCT No.: PCT/SE2013/051144
§ 371 (c)(1),
(2) Date: Apr. 2, 2015

(87) PCT Pub. No.: WO2014/055017
PCT Pub. Date: Apr. 10, 2014

(65) Prior Publication Data
US 2015/0233314 A1     Aug. 20, 2015

(51) Int. Cl.
*B60W 10/06*  (2006.01)
*B60W 10/11*  (2012.01)
(Continued)

(52) U.S. Cl.
CPC ........... *F02D 41/024* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS 5,131,293 A * 7/1992 Kaiser ................. F16H 59/72
                                                          477/100
5,646,842 A * 7/1997 Schulz ............... F16H 61/0206
                                                          475/127

(Continued)

FOREIGN PATENT DOCUMENTS

| EP | 1 384 876 A1 | 1/2004 |
| FR | 2 820 462 | 8/2002 |
| WO | WO 2005/019616 A1 | 3/2005 |

OTHER PUBLICATIONS

International Search Report mailed Jan. 24, 2014 in corresponding PCT International Application No. PCT/SE2013/051144.

*Primary Examiner* — Edwin A Young
(74) *Attorney, Agent, or Firm* — Ostrolenk Faber LLP (57) ABSTRACT

A method for regulating a temperature in an exhaust stream in a motor vehicle through control of its driveline. The motor vehicle includes a driveline having a combustion engine connected to a gearbox via a clutch device. The gearbox has several discrete gears. The driveline includes an exhaust system configured for the removal of an exhaust stream from the combustion engine. The method steps are: obtaining one or several first parameters $P_1$, wherein at least one of first parameters $P_1$ is a first temperature difference between a first temperature $T_1$ in the exhaust system and a reference temperature $T_{Ref}$; and controlling the gearbox, and thus controlling an operating point in the combustion engine, through downshift to a lower gear, and thus increasing engine speed and reducing a load on the combustion engine, if a value of the one or several first parameters $P_1$ exceeds a first threshold, and an upshift to a higher gear, and thus reducing an engine speed and an increase of a load on the combustion engine, if a value for the one or several first parameters $P_1$ is below a second threshold value. Further, a computer (Continued)

program, a computer program product, a system and a motor vehicle comprising such a system are disclosed.

26 Claims, 5 Drawing Sheets (51) Int. Cl.
*F02D 41/02* (2006.01)
*F01N 3/20* (2006.01)
*B60W 30/188* (2012.01)
*F16H 61/02* (2006.01)
*F16H 59/78* (2006.01)

(52) U.S. Cl.
CPC ......... *B60W 30/188* (2013.01); *F01N 3/2006* (2013.01); *F16H 59/78* (2013.01); *F16H 61/0213* (2013.01); *B60W 2710/0694* (2013.01); *F16H 2061/0232* (2013.01)

(56) References Cited

U.S. PATENT DOCUMENTS

| | | | |
|---|---|---|---|
| 5,997,434 A | 12/1999 | Graf et al. | 477/98 |
| 6,059,689 A * | 5/2000 | Shimizu | F16H 61/0213 477/98 |
| 2004/0204289 A1 | 10/2004 | Inoue et al. | 477/107 |
| 2006/0196285 A1 | 9/2006 | Steen et al. | 74/335 |
| 2007/0225116 A1 | 9/2007 | Berglund et al. | 477/111 |
| 2009/0156358 A1 | 6/2009 | Shamis et al. | 477/100 |
| 2009/0301061 A1 | 12/2009 | Sahlen et al. | 60/285 |
| 2012/0203434 A1 | 8/2012 | Sujan et al. | 701/64 |

* cited by examiner

REGULATION OF A TEMPERATURE IN AN EXHAUST AFTERTREATMENT SYSTEM

The present application is a 35 U.S.C. §§371 national phase conversion of PCT/SE2013/051144, filed Oct. 2, 2013, which claims priority of Swedish Patent Application No. 1251102-8, filed Oct. 2, 2012, the contents of which are incorporated by reference herein and Swedish Patent Application No. 1351152-2, filed Oct. 2, 2013, the contents of which are incorporated by reference herein. The PCT International Applications were published in the English language.

TECHNICAL FIELD

The present invention pertains to a method for the regulation of a temperature in an exhaust system through control of a motor vehicle's driveline. Further, the invention pertains to a computer program, a computer program product, a system and a motor vehicle comprising such a system.

BACKGROUND OF THE INVENTION

Laws and regulations for exhaust emission from motor vehicles have been drafted in many jurisdictions because of pollution and air quality, primarily in urban areas. These laws and regulations often consist of sets of requirements which define acceptable limits for exhaust emissions (emission standards) for motor vehicles equipped with combustion engines. For example, emission levels of nitrogen oxides ($NO_x$), hydrocarbons (HC), carbon monoxide (CO) and particles are often regulated for most types of vehicles.

In order to meet such emission standards, the exhausts caused by the combustion in combustion engines are aftertreated (purified). For example, a so-called catalytic purification process may be used, which is why aftertreatment systems usually comprise a catalyst. Further, aftertreatment systems may alternatively, or in combination with one or several catalysts, comprise other components, such as one or several particulate filters.

Figure 1:
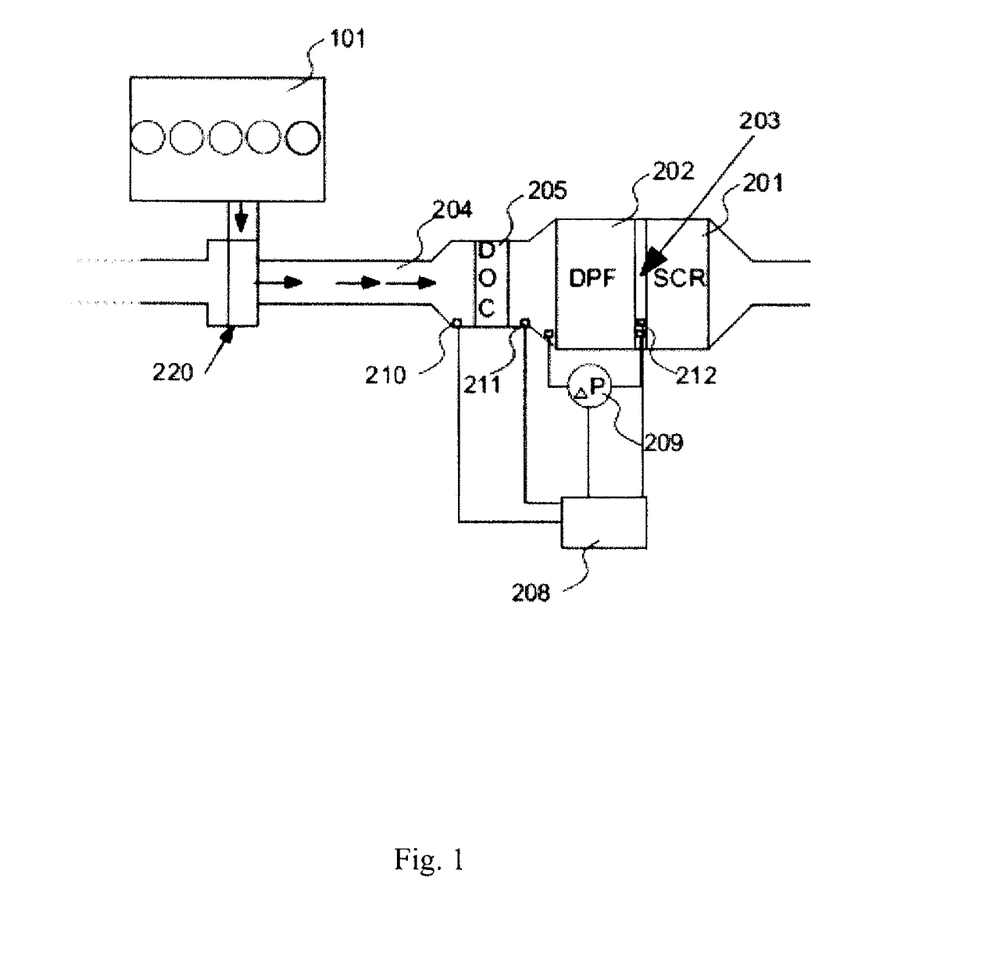
FIG. 1 is a schematic diagram of a system comprising a combustion engine and an exhaust system.

FIG. 1 shows the combustion engine 101 of a motor vehicle 100, where the exhaust stream generated by the combustion is led via a turbocharger 220. The exhaust stream is subsequently led via a pipe 204 (indicated with arrows) to a particulate filter (Diesel Particulate Filter, DPF) 202 via a diesel oxidation catalyst (DOC) 205. Further, the aftertreatment system comprises an SCR catalyst 201 (Selective Catalytic Reduction, SCR), arranged downstream of the particulate filter 202, which uses ammonia ($NH_3$), or a composition from which ammonia may be generated/formed, as an additive for the reduction of the quantity of nitrogen oxides $NO_x$. The particulate filter 202 may, alternatively, be arranged downstream of the SCR catalyst 201. The diesel oxidation catalyst DOC 205 has several functions and uses the surplus of air which the engine process generally creates in the exhaust stream as a chemical reactor jointly with a precious metal coating in the diesel oxidation catalyst. The diesel oxidation catalyst is normally primarily used to oxidise remaining hydrocarbons and carbon monoxide in the exhaust stream into carbon dioxide, water and heat, and for conversion of nitrogen monoxide into nitrogen dioxide.

In connection with combustion of fuel in the combustion engine's combustion chamber (cylinders), soot particles are formed. For this reason, the particulate filter is used to catch soot particles, and thus functions so that the exhaust stream is led through a filter structure where soot particles are caught from the passing exhaust stream and stored in the particulate filter. The particulate filter is filled with soot as the vehicle is driven, and sooner or later the filter must be emptied of soot, which is usually achieved with the help of so-called regeneration. The regeneration entails that the soot particles (mainly carbon particles) are converted into carbon dioxide and/or carbon monoxide in one or several chemical processes. Regeneration may occur in various ways and may for example occur with the help of so-called $NO_2$-based regeneration, often also called passive regeneration, or through so-called oxygen ($O_2$)-based regeneration also called active regeneration.

In connection with passive regeneration, nitrogen oxide and carbon oxide are formed in a reaction between carbon and nitrogen dioxide according to e.g. equation 1:

$$NO_2 + C = NO + CO \tag{1}$$

The passive regeneration, however, is heavily dependent on the availability of nitrogen dioxide. If the supply of nitrogen dioxide is reduced, the regeneration speed is also reduced. The supply of nitrogen dioxide may e.g. be reduced if the formation of nitrogen dioxide is hampered, which may e.g. occur if one or several components in the aftertreatment system are contaminated by sulphur, which normally occurs in at least some types of fuel, e.g. diesel. Competing chemical reactions also hamper the nitrogen dioxide transformation.

The advantage of passive regeneration is that desired reaction speeds, and thus the speed at which the filter is emptied, are achieved at lower temperatures. Typically, regeneration of the particulate filter during passive regeneration occurs at temperatures in the range of 200° C. to 500° C., although temperatures in the higher part of this interval are normally preferable. Notwithstanding this, compared to the significantly lower temperature interval in active regeneration, this thus constitutes a great advantage if e.g. an SCR catalyst is present, since there is no risk that such a high temperature level is achieved that there is a risk of damage to the SCR catalyst. Nevertheless, it is important that a relatively high temperature is achieved in order for an effective passive regeneration to take place.

In the event of active regeneration, so-called oxygen ($O_2$)-based regeneration, a chemical process occurs mainly according to equation 2:

$$C + O_2 = CO_2 + heat \tag{2}$$

Thus, carbon plus oxygen are converted, in active regeneration, into carbon dioxide plus heat. This chemical reaction, however, is heavily temperature-dependent and requires relatively high filter temperatures in order for a significant reaction speed to arise at all. Typically, a minimum particulate filter temperature of 500° C. is required, but preferably the filter temperature should be even higher in order for regeneration to occur at the desired speed.

Often the maximum temperature which may be used in active regeneration is limited by tolerances for some of the components comprised in the aftertreatment system/exhaust system. For example, often the particulate filter 202 and/or (where applicable) a subsequent SCR catalyst have constructional limitations with regard to the maximum temperature they may be subjected to. This entails that the active regeneration may have a maximum component temperature which is often undesirably low. Simultaneously, a very high minimum temperature is required in order for any usable reaction speed to arise at all. In active regeneration, the soot load is normally essentially totally burned in the particulate filter 202. This means that a total regeneration of the particulate filter is obtained, following which the soot level in the particulate filter is essentially 0%. Today it is increasingly common for vehicles to be equipped, in addition to a particulate filter 202, with an SCR catalyst 201, which is why active regeneration may entail problems in the form of overheating for the subsequent SCR catalyst treatment process.

Depending on how a vehicle is driven, the temperature of the exhaust stream resulting from the combustion will vary. If the combustion engine works hard, the exhaust stream will maintain a higher temperature, and vice versa if the load of the combustion engine is relatively low, the temperature of the exhaust stream will be significantly lower. If the vehicle is driven for a longer period of time in such a manner that the temperature of the exhaust stream maintains relatively low temperatures, e.g. temperatures below 150° C. to 300° C., a degradation of the function of the diesel oxidation catalyst 205 will occur because the reaction of the sulphur which is usually present in the fuel in various forms with the active coating of the diesel oxidation catalyst 205, usually comprising one or several precious metals or other applicable metals such as e.g. aluminium. At temperatures below 150° C. to 250° C., for example, an SCR catalyst will not function well. On the other hand, if the vehicle is driven for a longer period of time in such a manner that the exhaust stream's temperature maintains relatively high temperatures, this means that active regeneration may take place at the desired speed. However, the temperature in the exhaust stream may not exceed a maximum permitted temperature so that heat sensitive components in the aftertreatment system are damaged, as previously mentioned.

BRIEF DESCRIPTION OF THE INVENTION

One objective of the present invention is to provide a solution which wholly or partly resolves problems and/or disadvantages with solutions for the regulation of a temperature in an exhaust system according to prior art.

According to a first aspect of the invention, the above mentioned objective is achieved with a method for regulation of a temperature in an exhaust stream in a motor vehicle through control of its driveline. That motor vehicle comprises: a driveline comprising a combustion engine which may be connected to an automatic gearbox or a manual gearbox via a clutch device. The automatic gearbox or the manual gearbox has several discrete gears. The vehicle exhaust system is configured for removal of an exhaust stream from the combustion engine. The method comprises:

obtaining one or several first parameters $P_1$, where at least one of the one or several first parameters $P_1$ is a first temperature difference between a first temperature $T_1$ in the exhaust system and a reference temperature $T_{Ref}$; and controlling the automatic gearbox or the manual gearbox, and thus an operating point in the combustion engine through a downshift to a lower gear, and thus an increase of the engine speed and a reduction of a load on the combustion engine, if a value for the one or several first parameters $P_1$ exceeds a first threshold value; and an upshift to a higher gear, and thus a reduction of an engine speed and an increase of a load on the combustion engine, if a value for the one or several first parameters $P_1$ is below a second threshold value.

Different embodiments of the above method are disclosed. One method according to the invention may also be implemented in a computer program, which when executed in a computer achieves that the computer carries out the method according to the invention.

According to a second aspect of the invention, the above mentioned objective is achieved with a system for the control of one or several functions in a motor vehicle. The motor vehicle comprises: a driveline comprising a combustion engine which may be connected to an automatic gearbox or a manual gearbox via a clutch device, wherein the automatic gearbox or the manual gearbox has several discrete gears, and an exhaust system arranged for the removal of an exhaust stream from the combustion engine; where the system comprises:

a receiving device arranged to receive one or several first parameters $P_1$, wherein at least one of the one or several first parameters $P_1$ is a first temperature difference between a first temperature $T_1$ in the exhaust system and a reference temperature $T_{Ref}$; and a control device configured to downshift the gearbox to a lower gear, and thus increase the engine speed and reduce the load on the combustion engine, if a value for the one or several first parameters $P_1$ exceeds a first threshold value, and to upshift the gearbox to a higher gear, and thus reduce the engine speed and increase the load on the combustion engine, if a value for the one or several first parameters $P_1$ is below a second threshold value.

The above mentioned system is preferably arranged in a motor vehicle, such as a bus, a truck or another similar motor vehicle.

With a method or a system according to the present invention, an improved solution for the regulation/control of a temperature in an exhaust stream in a motor vehicle is obtained. For example, the invention facilitates the regulation of the temperature in such operational cases where the regulation of the temperature has not been possible or sufficient with solutions according to prior art. This applies in particular to the operational cases where the engine has a low load or at low outdoor temperatures. An example of a low load on the engine is e.g. on dragging (engine braking) of the vehicle when air is pumped through the exhaust system.

With temperature regulation according to the present invention it is possible for components in the exhaust system, such as particulate filters and catalysts, to work efficiently since the temperature in the exhaust system may be adapted quickly and with high precision to the components' optimal operating temperature. The risk for components in the exhaust system to be damaged due to overheating is thus also reduced.

Further, the invention provides a more fuel efficient method of reaching a desired temperature or of maintaining/keeping a current temperature in the exhaust system compared to prior art. With regulation of the temperature through control of the driveline with one or several first parameters $P_1$ and control of up- and downshifts of the gearbox according to the invention, measures, for example, entailing a large fuel consumption may be avoided, for example activation of an external heater or engine regulation aimed at increasing the exhaust temperature by reducing the efficiency of the engine.

Another advantage of the invention is that it is not necessary to equip the vehicle with further parts/components in order to achieve the advantages of the invention since already existing parts/components in the vehicle may be used, which entails a great cost saving.

Further advantages and embodiments of the invention are set out in the following detailed description.

BRIEF DESCRIPTION OF FIGURES

The present invention is described with reference to the enclosed figures where.

DETAILED DESCRIPTION OF AN EMBODIMENT

Figure 2:
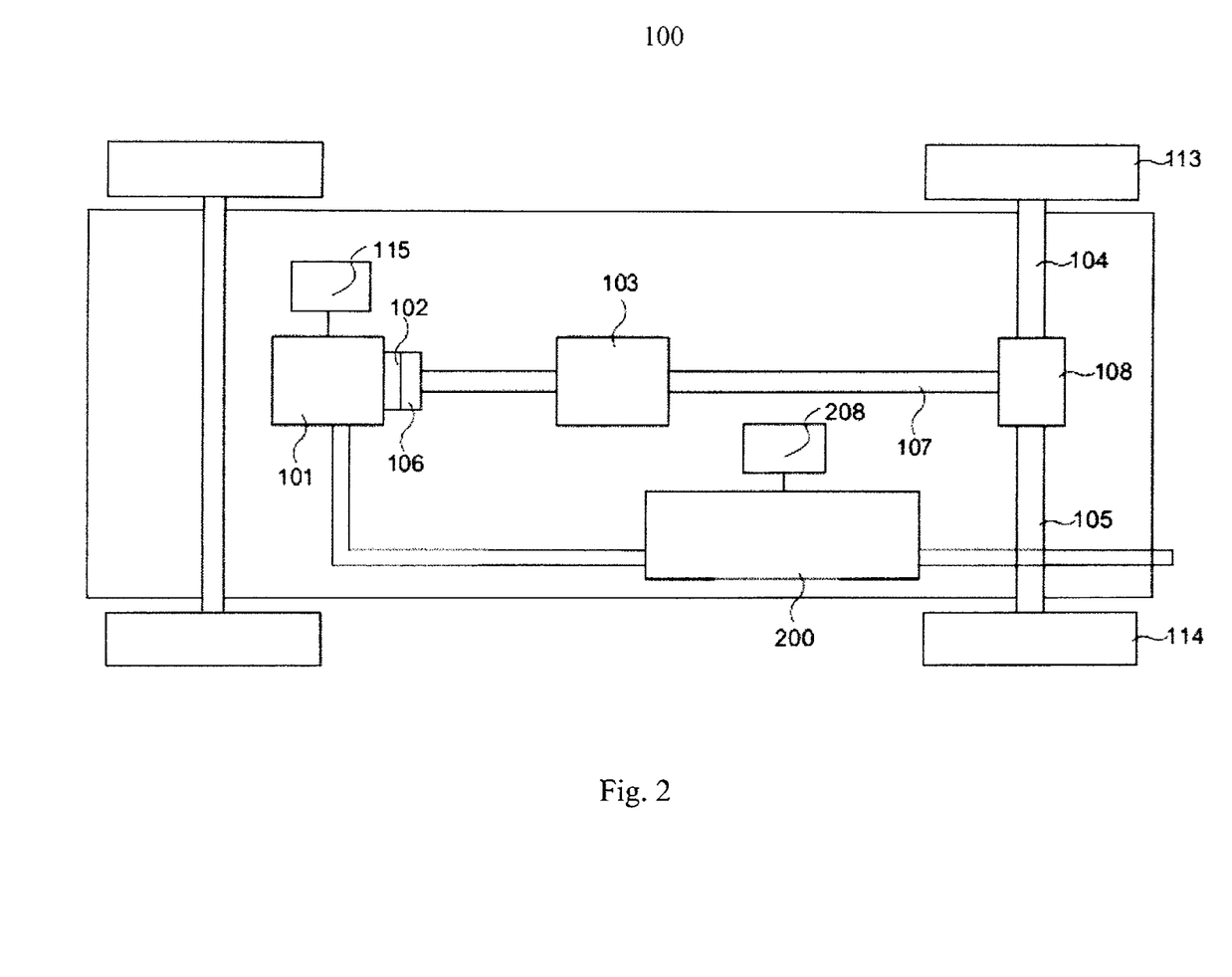
FIG. 2 is a schematic diagram of an example vehicle.

FIG. 2 is a schematic diagram of a motor vehicle 100, such as a truck, bus or other similar motor vehicle. The vehicle 100 schematically shown in FIG. 2 comprises a pair of front wheels 111, 112 and a pair of rear wheels with driving wheels 113, 114. The vehicle also comprises a driveline with a combustion engine 101 (e.g. a diesel engine), which via an output shaft 102 on the combustion engine is connected to a gearbox 103, for example via a clutch device 106. The clutch device may consist of an automatically controlled clutch and be controlled by the vehicle's control system via a control device 115, 208, which may also control the gearbox 103. An output shaft 107 from the gearbox 103 drives the driving wheels 113, 114 via a final drive 108, such as a differential, and drive shafts 104, 105 connected to the final drive 108.

The vehicle 100 also has an exhaust system arranged to remove an exhaust stream generated by the combustion engine 101 on a combustion in the same. As shown in FIG. 1, the exhaust system may comprise an aftertreatment system (exhaust purification system) for the treatment (purification) of exhaust emissions from the combustion engine 101. However, it is not necessary for the exhaust system to comprise such an aftertreatment system and, in addition, the exhaust system may comprise other parts/components such as a turbo, a silencer system, and gas flow systems for EGR.

The gearbox 103 is usually a manual gearbox; an automatic gearbox, such as an automatic gearbox, automatic manual gearbox (Automatic Manual Transmission, AMT) or double clutch gearbox (Double Clutch Transmission, DCT); or a continuous variable gearbox (Continuous Variable Transmission/Infinitely Variable Transmission, CVT/IVT).

A manual gearbox 103 is a gearbox with a number of discrete gears and is arranged to be manoeuvred by the driver for engagement or disengagement of gears (e.g. forward and reverse gears).

An automatic gearbox also has a number of gears, i.e. it comprises several discrete gears. However, it differs from a manual gearbox in that it is controlled/manoeuvred by a control system comprising one or several control devices, also called ECUs (Electronic Control Unit). The control device or ECU is arranged to control the gearbox 103, for example on a shift from gear selection at a certain speed with a certain running resistance. Also, the ECU may measure the speed and torque of the engine 101 and the condition of the gearbox. Information from the engine or the gearbox may be sent to the ECU in the form of electric communications signals via e.g. a so-called CAN (Controller Area Network) bus installed in the motor vehicle 100.

The gearbox 103 has been illustrated schematically as one device. However, it should be noted that the gearbox may also physically consist of several cooperating gearboxes, for example a so-called range gearbox, a main gearbox and a split gearbox, which are arranged along the vehicle's driveline. Gearboxes according to the above may comprise any number of suitable discrete gears. Today's gearboxes for heavy goods vehicles usually have twelve forward gears, two reverse gears and one neutral gear.

A continuously variable gearbox, also called a CVT gearbox or IVT gearbox, is another type of well known gearbox, which differs from the previous gearbox types since it does not have a number of discrete gears corresponding to different gearings but instead has a continuously variable gearing. In this type of gearbox, gearing may thus within certain limits be controlled to the exact gearing desired.

In relation to upshifts and downshifts, an upshift means that a higher possible gear in the gearbox is selected, while a downshift means that a lower possible gear in the gearbox is selected. This applies to gearboxes with several discrete gears. For continuously variable gearboxes, "fictitious" gear steps may be defined and the shifting gears may occur in the same manner as for a gearbox with discrete gear steps. However, the usual way of controlling such a continuously variable gearbox is to let the gearing vary depending on other relevant parameters. The control of such a gearbox is usually integrated with the control of the combustion engine's speed and torque, i.e. its operating point. A common method is to let control of the continuously variable gearbox be based on a current driving power requirement, e.g. calculated based on a gas pedal position and a speed for the vehicle, and which operating point gives the best effect in order to achieve the driving power requirement. Gearing in the continuously variable gearbox thus becomes a result of which engine speed leads to the optimal operating point for the current driving power requirement. Aspects other than efficiency may also be taken into account in the choice of operating point for the engine. These may be e.g. driveability-related aspects, such as torque response times, i.e. how long it would take to achieve a higher driving wheel torque, or how much torque may be obtained during a certain time period.

Further, a so-called activation of coasting entails that the vehicle's engine 101 is mechanically disconnected from the vehicle's driving wheels 110, 111, i.e. that the driveline is opened, while deactivation of coasting entails that the driveline is closed. Disconnection of the driving wheels from the engine may, for example, be achieved by putting the gearbox 103 in a neutral gear, or by opening the clutch device 106. In other words, essentially no power is transmitted through the gearbox from the engine to the driving wheels during coasting.

In the present invention, it is assumed that the driveline of the motor vehicle 100 comprises an automatic gearbox or a manual gearbox of the type described above with several discrete gears. Further, it is assumed that the motor vehicle comprises a combustion engine 101 and an exhaust system connected to the combustion engine for removal of an exhaust stream from the combustion engine.

One method according to the present invention for the regulation of a temperature comprises the steps: obtaining one or several first parameters $P_1$, where at least one of the one or several first parameters $P_1$ is a first temperature difference between a first temperature $T_1$ in the exhaust system and a reference temperature $T_{Ref}$; and control of the automatic gearbox or the manual gearbox, and thus an operating point in the combustion engine through downshift to a lower gear, and thus an increase of engine speed and a reduction of a load on the combustion engine, if a value for the one or several first parameters $P_1$ exceeds a first threshold, and an upshift to a higher gear, and thus a reduction of an engine speed and an increase of a load on the combustion engine, if a value for the one or several first parameters $P_1$ is below a second threshold value. The control of the automatic gearbox preferably takes place through control of the gear in the automatic gearbox or the manual gearbox. The reference temperature $T_{Ref}$ is according to one embodiment of the invention a desired temperature, i.e. a so-called setpoint temperature.

Control of the automatic gearbox means that a control system controls the gearbox as described above. Control of the manual gearbox (or an automatic gearbox in manual mode) means, instead, that a driver of the vehicle changes gears as guided by a presentation/indication system which is arranged to present/indicate a suitable desired gear to the driver according to the previous algorithm for gear selection. Thus, the presentation/indication system entails a driver support for the driver ("driver support") when shifting while driving the vehicle. The presentation may, for example, involve visual, audio or tactile presentation/indication or combinations thereof with suitable arrangements for this purpose.

According to the above, the following principles for control of the gearbox are applicable for the engine to reach a desired temperature: downshift to a lower gear and thus a higher engine speed and lower torque and thus a higher flow and colder exhausts if a value for the one or several first parameters $P_1$ passes a first threshold value; and upshift to a higher gear and thus a lower engine speed and a higher torque and thus a lower flow and warmer exhausts if a value for the one or several first parameters $P_1$ is below a second threshold value. The first and second threshold values may assume, or be dependent on a value within, or in the vicinity of the temperature range which was previously discussed, i.e. above 200° C. to 250° C. for $NO_x$ conversion; above 250° C. to 350° C. for passive regeneration; and below 550° C. to 600° C. to avoid damaging components in the exhaust system.

The one or several first parameters $P_1$ are preferably used as in-parameters for a control algorithm arranged to control the temperature in the exhaust system at a desired value through control of the driveline (e.g. gearbox and clutch), according to the described upshift and downshift according to the invention. The control algorithm may be of many different types and may be an algorithm which only looks at the first parameter and uses one or several threshold values (e.g. one higher and one lower threshold value) to determine which control measure should be taken. More advanced algorithms use additional parameters, as described below.

The present invention entails a possibility of maintaining the temperature in, e.g. a catalyst, at a desired level being obtained and thus certain emission levels from the vehicle are guaranteed. This is also a fuel effective manner of controlling the temperature, compared to other measures such as deteriorating the combustion efficiency of the engine.

Preferred temperature intervals against which the temperature in the exhaust system is regulated according to one embodiment are for example temperatures above 200° C. to 250° C. for a good $NO_x$ conversion in SCR catalysts depending on the flow and SCR volume since a high flow and a low volume requires higher temperatures. For an efficient passive regeneration, the temperature must be above 250° C. to 350° C. depending on the $NO_x$/PM quota (Particulate Matter) where a higher quota requires lower temperatures. However, the temperature in the exhaust system should preferably be maintained lower than 550° C. to 600° C. in order to avoid damaging components in the exhaust system.

According to one embodiment of the invention, the one or several first parameters $P_1$ are selected from a group comprising:
  a first temperature $T_1$ which may be a temperature in an area of the exhaust stream or a surface, liquid or substrate temperature in any part or component of the exhaust system such as a particulate filter, catalyst, silencer, sensor, etc.; and
  a second temperature difference between the first temperature $T_1$ and a second temperature $T_2$ in the exhaust system. The second temperature $T_2$ is another temperature in the exhaust system than the first temperature $T_1$. However, this temperature $T_2$ may be a temperature in an area of the exhaust stream or a surface, liquid or substrate temperature in any part or component of the exhaust system, such as a particulate filter, catalyst, silencer, sensor, etc.

According to another embodiment of the invention, the reference temperature $T_{Ref}$ is any of a temperature in a component in the exhaust system, such as a temperature of a wall on an exhaust component; a temperature of a liquid injected in the exhaust system, such as the temperature of injected urea, petrol or diesel; or a temperature in a component installed in connection with the exhaust system, such as control devices, different types of sensors/givers and actuators. This is in order to obtain a good function of the components or processes and/or to avoid damaging the comprised or connected parts and components.

According to another embodiment of the invention, a time derivative and/or a time integral of the first temperature difference and/or the second temperature difference is used. The use of a time derivative is advantageous if the control system is to react quickly to a temperature change, while the use of a time integral instead entails that the control system takes into consideration long term trends in the temperature change, which is advantageous for long term control of the temperature in the exhaust stream.

The above mentioned current temperature and temperature differences and functions thereof may be based on sensor values obtained from one or several sensors arranged at, in connection with, or inside the exhaust system. Signals from sensors may be sent over, for example, a communications bus or a wireless link to one or several control devices for signal processing. The temperature differences and functions thereof may also be based on so-called virtual sensors, i.e. sensor values which are calculated from other real sensor signals with the use of one or several sensor models, which provides so-called current values.

The advantage of using current temperatures and temperature differences and functions thereof is that these may be used directly for the determination of the first parameter $P_1$ without complex or resource-demanding calculations with the use of various simulation models. Thus, these current values may also be obtained quickly.

Further, it is realised that the one or several first parameters $P_1$ may be calculated (predicted) values, e.g. selected from the group comprising: a calculated first temperature $T_1$ which may be a calculated temperature in an area of the exhaust stream or a surface, liquid or substrate temperature in any part or component of the exhaust system such as a particulate filter, catalyst, silencer, sensor, etc.; a first calculated temperature difference between the first temperature $T_1$ and a reference temperature $T_{Ref}$ in the exhaust system; a second calculated temperature difference between the first temperature $T_1$ and a second temperature $T_2$ in the exhaust system. The second calculated temperature $T_2$ is another temperature in the exhaust system than the first calculated temperature $T_1$. However, the second calculated temperature $T_2$ may also be a temperature in an area of the exhaust stream or a surface, liquid or substrate temperature in any part or component of the exhaust system such as a particulate filter, a catalyst, silencer, sensor etc.; and a time derivative and/or a time integral of the calculated first temperature $T_1$, or the first calculated temperature difference, or the second calculated temperature difference. The advantages of using time derivatives or time integrals of predicted values are the same as when using time derivatives and time integrals of current values.

By using one or several first calculated parameters $P_1$ information is obtained about how the relevant parameters will vary over time, which means that the system for the regulation of the temperature in the exhaust system may be controlled so that the desired temperatures may be obtained in the best possible manner in the future. This applies in particular to slow systems in which a temperature takes a long time to change, e.g. catalysts or other components, which require early measures for the avoidance of overshoots in the regulation of a temperature.

Calculated (predicted) parameters means that they are calculated or simulated in advance based on (mathematical) models of the vehicle and/or the components of the vehicle. Based on one or several calculated first parameters $P_1$, a control strategy for controlling the gear in the gearbox may be selected from among several different possible control strategies. By calculating/simulating how the first parameter $P_1$ will vary over the road sections lying ahead for the vehicle according to one or several different control strategies, the control strategy which achieves certain requirements, e.g. that the temperature remains within a predefined limit value while being optimal from another perspective, e.g. fuel and/or urea consumption, may be selected. The above therefore entails that the one or several first parameters $P_1$ may also be calculated based on one or several different future control strategies for the gearbox. This embodiment thus pertains to a feedback method where one or several first parameters $P_1$ are used for the calculation of one or several control strategies based on one or several possible operating points, i.e. operating points which may possibly be used having regard to other requirements such as driveability or fuel consumption. The one or several control strategies are subsequently used in order to predict new one or several first parameters or in order to update the existing parameters. Further, it should be noted that even if only one control strategy is calculated, information derived from this single control strategy may be used by the control system in order to determine whether it may reasonably be used or whether it is better to let the vehicle be driven with the current operating point for the control of the gearbox.

As mentioned above, the inventors have thus realised that the one or several calculated first parameters $P_1$ may be calculated over a road section ahead of the vehicle, for example by simulation over the road section ahead. According to this embodiment, the calculated first parameters $P_1$ may be determined based on one or several vehicle-specific and/or road-specific data for the vehicle. These may preferably be selected from the group comprising: inclination of the road ahead of the vehicle, curve radii of the road section ahead, speed limits of the road section ahead; motor vehicle weight; rolling resistance of the motor vehicle; air resistance of the motor vehicle; engine-specific data such as maximum output, minimum output, maximum torque, minimum torque, exhaust flow, exhaust gas recirculation content and lambda values (i.e. air/fuel mixture); and installation specific data such as the possible accumulation of substances and/or release of substances and/or conversion of substances in the exhaust system and a surface in the exhaust system in contact with the exhaust stream. Further, driver-interactive data which is related to the driver's driving style may be used in connection with the calculation of the one or several first parameters $P_1$, so that the vehicle's future behaviour is taken into account when the calculation is made. Examples of driver-interactive data include: the use of blinkers, gas pedal position, and use of brakes.

One advantage with the use of vehicle-specific and/or road-specific data in control is that the system may determine in advance whether any control strategy for one or several functions (e.g. gearing, external load, external heater, regulations of flow etc.) needs to be used to avoid that the temperature ends up outside a preferred temperature range. Thus, the use of unnecessary control strategies is avoided and also the system may act proactively in the event any measure should be required, i.e. the system may act in advance.

According to one special embodiment, the first temperature $T_1$ is a temperature in the exhaust stream and the second temperature $T_2$ is a surface, liquid or substrate temperature in the exhaust system. A surface temperature is a temperature on a surface of the exhaust system or a part thereof, which impacts the heat conductivity (losses) from the exhausts and the heating of components in the exhaust system. Liquid temperature means the temperature in a liquid present in the exhaust system, such as urea or water. This temperature impacts the heat conductivity to the liquid and thus the evaporation of the same. The latter temperature, the substrate temperature, means the temperature in a material in e.g. a catalyst, a particulate filter, or in a $NO_x$ trap. The substrate temperature impacts the heat conductivity to the exhaust treatment system and the exhaust treatment system's function (i.e. the physical and chemical processes). The first $T_1$ and the second $T_2$ temperature may be a current or a calculated first $T_1$ or second $T_2$ temperature.

Further, it should be understood that the one or first parameters $P_1$ used in the control of the gearbox may consist of only current values, or consist of only calculated values, or be a combination of current and calculated values depending on the application.

The control of the gearbox may according to another preferred embodiment take place by calculating an operating point for the combustion engine based on the one or several first parameters $P_1$. Subsequently, the calculated operating point is used to control the gearing in the gearbox and thus to regulate the temperature $T_{Ex}$ in the exhaust stream. Generally, a desired/optimal operating point is selected among several possible operating points, and subsequently the driveline is controlled, e.g. by control of the gearbox in this case, so that the engine approximates the optimal operating point. A desired/optimal operating point means an operating point which is the best among all possible operating points for the purpose which the system wishes to achieve. In this case, the best operating point is the operating point which causes the temperature in the exhaust system to approximate its corresponding reference temperature as much as possible. In other cases, it may relate to e.g. an operating point which leads to the lowest consumption of e.g. fuel or urea, having regard to the statutory emission requirements and driveability, etc.

Usually, a gearbox is controlled to approximate an engine speed and thus an operating point so that the best total efficiency is achieved in the driveline, but driveability aspects are usually also taken into consideration. For example, the engine speed may be set higher than optimal in order for a torque reserve to be available if the driver e.g. accelerates before an uphill slope. According to the above embodiment, the temperature in the exhaust stream is used as a parameter for the calculation of gear and engine speeds, and thus emission targets are also taken into consideration when selecting gears. Thus, the emission target may be achieved without requiring any additional fuel demanding measures. Alternatively, it is not necessary to equip the vehicle with additional parts/components in order to maintain the catalyst's temperature and thus emission levels, for example.

Normally, the gear is selected so that a desired drive power requirement may be delivered, i.e. that the driver's request is complied with to the greatest extent possible. However, in certain cases, the control system may deviate from this principle and instead allow the drive power to be intentionally lower than as requested by the driver/vehicle. This means that the system allows the gearbox to remain in a higher gear and thus intentionally lets the engine remain at a lower engine speed than what is required in order to deliver the drive power requested.

The calculation of the gear may also be based on further parameters related to:
- an efficiency level for the driveline, which must be taken into consideration in order to achieve as fuel efficient driving of the vehicle as possible;
- a requested drive power requirement, which is usually used for the vehicle to be driveable, i.e. have the characteristics so that it may be driven in a comfortable manner and in a manner where the vehicle to the greatest extent possible behaves as requested by the driver, e.g. maintains a certain speed, delivers the torque requested by the driver with the gas pedal, etc.;
- speed limits in the engine and the driveline in order not to have a higher or lower engine speed than what the driveline is dimensioned for,
- the engine's torque/power curve as a function of the speed in order to determine how much torque is available after a gear shift,
- vehicle and road characteristics, such as vehicle weight, rolling resistance, air resistance and road inclination are used to calculate how much drive power is needed,
- efficiency for an exhaust treatment system (also called aftertreatment system) installed in the exhaust system in order to achieve as high conversion levels in catalysts and thus as low emission levels as possible,
- exhaust emissions for the combustion engine before they have been purified by an exhaust treatment system,
- a torque response, i.e. how quickly a requested increased drive wheel torque impacts the vehicle's actual drive wheel torque. This aspect is relevant in the calculation of the operating point since the driver's control of the gas pedal must also be taken into consideration. Otherwise, there is a risk that the driver perceives that the vehicle does not respond to the driver's control of the gas pedal, and
- other driveability aspects, such as noise, vibrations and turning of the vehicle so that the vehicle may be driven comfortably.

Also, parameters related to external loads are very useful in the calculation and control of the operating point. Examples of external loads are auxiliaries such as a water pump, fan or compressor; generator; hybrid generator or similar energy recycling system; retarder, exhaust brake or other auxiliary brakes. The external load's power requirement may be controllable, so that the freedom in selecting an operating point for the engine is increased, which in turn means that also operating points which lie outside the vehicle's driving power requirement may be used for the regulation of the temperature in the exhaust system. Typically there are only a few operating points to choose from, namely those that correspond to the engine speed for the different discrete gears which are available, but in this case the level of freedom to be able to increase/reduce the engine torque with the external load is further facilitated. In some cases, the external load is of the "on" or "off" type, i.e. it is either activated or not, and in these cases the control and calculation of the operating point is limited to determining whether or not the external load should be activated. If the temperature $T_{Ex}$ in the exhaust system is to be increased, the external load must be increased according to one embodiment of the invention, which is suitable if the temperature in the exhaust system is too low so that particulate filters and catalysts work at too low temperatures.

When it comes to selecting an operating point among a number of candidate operating points, the number of candidate operating points according to one embodiment shall consist of operating points that may be achieved having regard to a speed in the vehicle and the gears available in the gearbox. Further, as mentioned above, the engine torque may be varied with the help of the external load. However, the engine speeds which are still available are limited to those which may be achieved based on the vehicle's speed and gears available in the gearbox. The speed of the vehicle may either be the current speed, the desired speed or a calculation of how the speed will behave in the future.

In order to further increase the freedom in the selection of an operating point, the vehicle's speed may also be selected based on an operating point calculated as per above. This embodiment is especially suitable in cases where the vehicle has a cruise control system installed and activated. A speed offset value may then be used to regulate a cruise control reference value, which is a value specified by the driver and indicates the speed which the vehicle must maintain with the cruise control. This means that the speed offset value is added to or subtracted from the cruise control reference value. In this case, the possibilities of achieving the optimal operating point are increased, since the number of possible operating points increases with respect to the engine speed since it is linear depending on the vehicle's speed.

The inventors have also realised that the one or several first parameters $P_1$ are suitable for the control of other functions in the vehicle for regulation of the temperature $T_{Ex}$ in the exhaust system. These functions must have a direct or indirect impact on the temperature in the exhaust system $T_{Ex}$. Thus, the regulation of the temperature in the exhaust system $T_{Ex}$ may be more efficient and quicker. Suitable functions are related to the conversion of exhaust heat into energy; external heating of the exhaust system; injection of fuel into the engine; and regulation of the exhaust flow. It should be realised that the one or several first parameters $P_1$ may be used to control such a function or a combination of two or several such functions.

The one or several first parameters $P_1$ may be used for the control of a system arranged for conversion of exhaust heat into energy (Waste Heat Recovery, WHR). The regulation of the temperature with the system for the conversion of exhaust heat into energy takes place, according to one embodiment, by the maximum energy in relation to the input energy, or total converted energy, being taken out via the system. This regulation is preferably aimed at maximising the heat conduction into the external system and is designed for example as a PID or MPC regulator (Proportional Integral Derivative, PID; Model Predictive Control, MPC).

According to another embodiment of the invention, the system for conversion of exhaust heat into energy is installed upstream in the exhaust system in relation to an area in which a temperature is desired to be obtained. When the system is installed according to this embodiment, it is controlled so that the system acts in a normal mode if the temperature $T_{Ex}$ in the exhaust system is to be reduced, and in an opposite mode if the temperature in the exhaust system $T_{Ex}$ is to be increased. Normal mode means that the system uses waste energy, e.g. heat from the exhausts, in order to generate electric or mechanic energy (and sometimes chemical energy). Where the system operates in the opposite (reverse) mode, this means that the system is instead supplied with energy in order to increase the temperature of the exhausts.

Further, the one or several first parameters $P_1$ may be used for the control of at least one external heater for the exhaust system. The external heater's task is to increase the temperature in the exhaust flow or any part/component in the exhaust system. Preferably, the external heater is:
- a burner installed in the exhaust system after the combustion engine's cylinders;
- a system arranged for the injection of hydrocarbons for oxidation or combustion on a catalyst placed in the exhaust system;
- an electric heater installed in the exhaust system after the combustion engine's cylinders; or
- any other suitable external heater installed in, or in close connection with, the exhaust system.

The external heater is preferably controlled so that a maximum temperature increase is obtained in relation to the input energy, or so that the temperature increase is maximised. However, the external heater may instead be controlled so that the temperature increase speed is prioritised. The control of the external heater may be configured as a PID or MPC regulator.

As mentioned above, the one or several first parameters $P_1$ may also be used for control of a fuel injection system arranged for injection of fuel to the combustion engine for the regulation of the temperature in the exhaust system. This may occur through control of the number of post-injections, the time (CAD) for the post-injections, the pressure of the post-injections, and the fuel amount per post-injection. The control of the fuel injection system may be implemented as pre-controlled or feedback control with e.g. MAP (matrix based regulation structure), PID or MPC. As a setpoint for this control, a temperature which is downstream of the engine as well as a component in the exhaust system, e.g. a diesel oxidation catalyst (DOC) or temperature difference over the component in the exhaust system may be used. According to one embodiment, the control of fuel injection compensates for the efficiency (in the DOC) in the transition between chemical energy tied in the fuel to heat energy emitted by the exhausts.

Another factor impacting the temperature in the exhaust system $T_{Ex}$ is the characteristics for the exhaust flow in the exhaust stream. For this reason, the one or several first parameters $P_1$ may also be used for the control of the exhaust flow, or one of the exhaust flows depending on the parameter, such as heat transfer coefficients.

Figure 3:
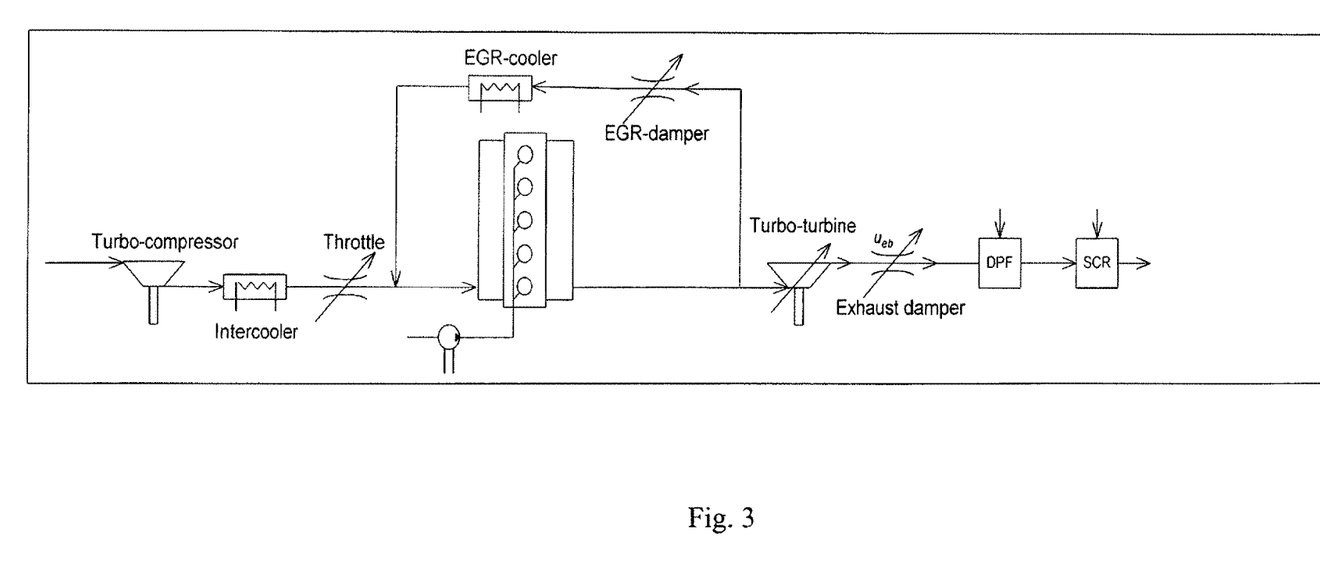
FIG. 3 is a schematic diagram of a gas flow in an engine system.

Control of the exhaust flow may, for example, occur through control of a gas flow system for exhaust gas recirculation (EGR) and/or through control of an intake system for the engine. FIG. 3 shows schematically a general gas flow in an engine system, where the engine system in this example comprises a diesel engine with a turbo and a number of pipes connected to the engine. Air is sucked in from the left in FIG. 3 with an intake system for the engine. The air which is sucked in passes through an intake pipe and is compressed in a turbocharger in order to be cooled subsequently by an intercooler before it passes, in certain cases, a throttle butterfly that regulates the amount of air into the diesel engine. The air is then mixed with recirculated exhausts with a gas flow system for exhaust gas recirculation (EGR) and this mixture is then sucked into the engine's cylinders in order to be mixed with diesel or another fuel before combustion occurs in the engine.

The exhausts from the combustion process then pass through a turbo turbine which sets the turbocharger into motion. Parts of the exhausts, however, enter into an EGR pipe and are led back to the intake pipe via an EGR damper and one or several EGR coolers. The EGR damper's function is to regulate the amount of recirculated exhausts back to the combustion process. When the EGR gases are cooled, the use of EGR will move heat energy from the exhausts to the engine's cooling system. Before the exhausts disappear entirely from the engine system, in some engines they pass through an exhaust damper (if installed) which controls the pressure in an exhaust collector (not shown in the figure). Subsequently, the exhausts pass through an aftertreatment system which may contain a diesel particulate filter and/or an SCR catalyst, as mentioned previously. If the engine 101 is not heavily loaded, the exhausts will have a lower temperature than desired and thus cool the catalyst. One way of limiting the amount of cooling exhausts is to use a damper arranged in an intake pipe for air to the engine. Thus, the amount of air entering the engine may be limited, which in turn means the exhausts exiting the engine are also limited, which, with a given load, results in warmer exhausts. This damper is usually called a throttle butterfly, as mentioned above. The amount of air which the engine consumes is determined to a large extent by the speed of the engine, which in this case means that: the higher the engine speed, the more air flow is required to the engine.

According to the present invention, the one or several parameters $P_1$ may be used to control the gas flow system for exhaust gas recirculation (EGR) and/or the air intake system arranged for the regulation of an air flow to the engine. In addition, the control of the gas flow system for exhaust gas recirculation (EGR) and the intake system may be controlled with additional parameters related to a transferred output to a component installed in the exhaust system and/or emissions produced by the combustion engine. Emissions in this context mean, for example, exhausts and noise. Further, a reduction of the exhaust flow may be combined with an increase of the engine load to increase the temperature in the exhaust system. This embodiment may be realised with, for example, a pre-controlled or feedback control of an exhaust brake with the use of: a setpoint value for the temperature or a value which is a function of the setpoint value for the temperature; or a setpoint value for the energy content of the exhausts or with a value as a function of the setpoint value for energy content.

Figure 5:
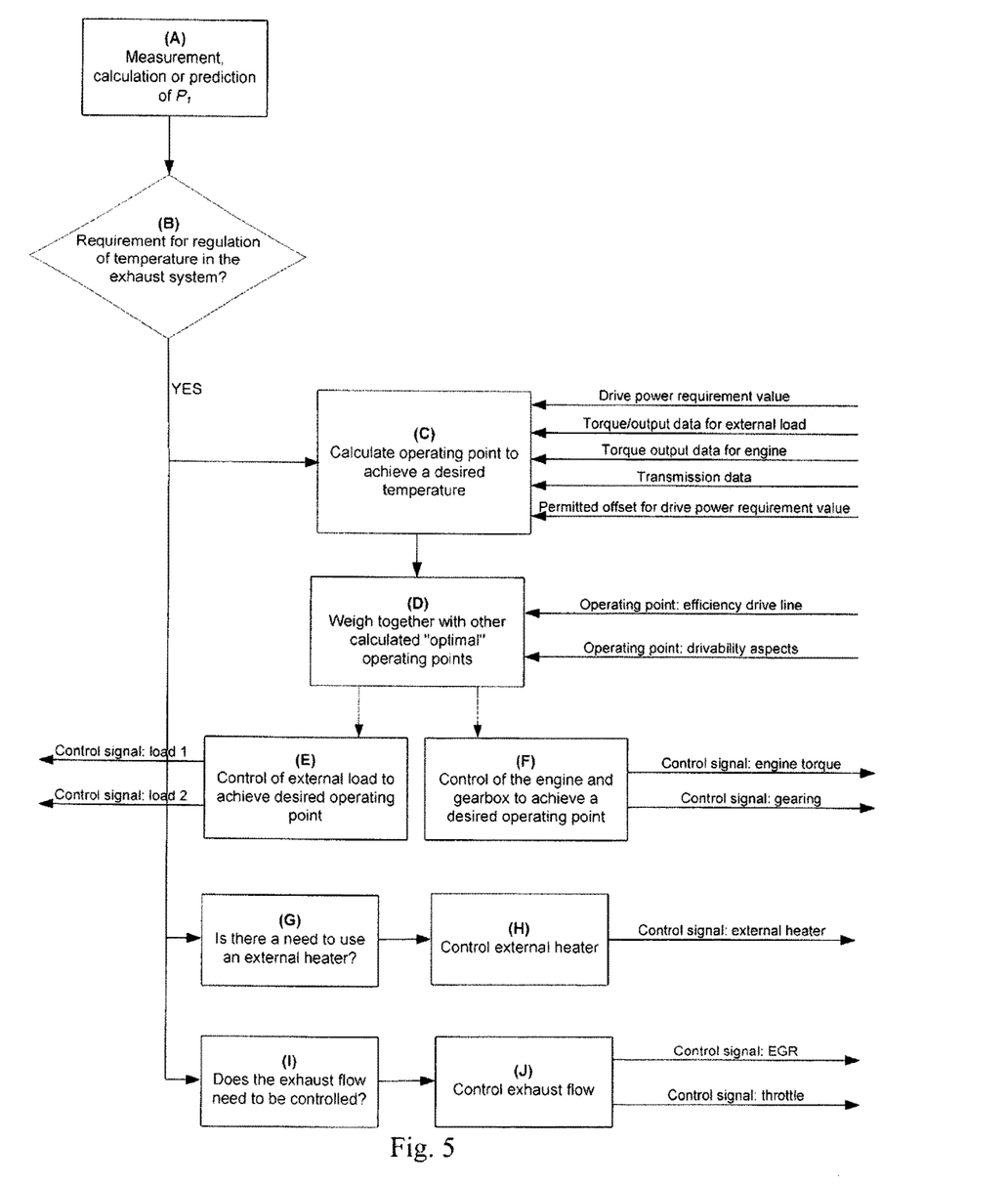
FIG. 5 shows a flow diagram of one embodiment of the invention.

Further, FIG. 5 shows a flow diagram of an exemplified embodiment of the method according to the invention:
- A. At A, the first parameter $P_1$ from other sensor signals (virtual sensor) is measured or calculated. The first parameter $P_1$ may also be calculated over the road section ahead for the vehicle at A.
- B. Based on the value for the first parameter $P_1$, it is decided at B whether a temperature regulating measure needs to be taken. This may, for example, take place by a comparison of the first parameter $P_1$ with a threshold value, or by comparing several calculations of the first parameter $P_1$ with related control strategies, and based on these, selecting which temperature regulations measure(s) need(s) to be taken.

C. If a temperature regulating measure is to be taken, at C the operating point for the engine is calculated which in the best way (e.g. the fastest or most fuel efficient way) leads to a desired temperature in the exhaust system. Other parameters may also be taken into consideration in the calculation at C, such as drive power requirement value, torque/output data for external load, etc.

D. The operating point calculated at C is translated at D into a gear among the discrete gear steps, which are available according to the principle for upshift and downshift, respectively, according to the invention (see also the embodiment below for regulation of gear points). At D, the desired gear is also weighed up with desired gears with respect to other aspects, such as driveability aspects and total efficiency for the driveline.

E. At E, the external load is set at the desired value corresponding to the desired operating point calculated at C (desired torque).

F. At F, the gearbox is controlled so that a desired gear is engaged, which is achieved by the control system engaging the desired gear in the automatic gearbox, or by the desired gear being presented/indicated to the driver so that the latter manoeuvres the manual gearbox to engage the desired gear.

G. If the adjustment of the operating point (gear and external load) is not sufficient to achieve the desired temperature, it is decided at G whether an external heater should be activated if the temperature needs to be increased. However, the external heater could have been activated already at B.

H. At H, the external heater is controlled following the decision at G.

I. If the adjustment of the operating point is insufficient to achieve a desired temperature in the exhaust system, it is decided at I whether the exhaust flow needs to be controlled with e.g. the help of an EGR and/or a throttle butterfly.

J. At J, the exhaust flow is controlled after the decision at I.

According to another embodiment of the invention, the control takes place according to the following: if the temperature in the exhaust system is higher than a threshold value, the system moves up the gearing point, i.e. the engine speed at which the gearbox control system upshifts. This gearing point may be based on many different parameters, such as current road inclination, current gas pedal position, available engine torque, etc. In this case the system also includes the temperature into the exhaust system in the choice of a gearing point. In the same manner, the system moves up the downshift point, i.e. the engine speed at which the gearbox performs a downshift. If the temperature in the exhaust system is lower than a threshold temperature, the system operates in the reverse, i.e. the system moves the gearing points downwards. However, moving the gearing points need not be based on threshold values but the movement of gearing points may also take place continuously, i.e. the gearing points may be adjusted continuously depending on the temperature in the exhaust system. According to this embodiment, the gearing points are thus dependent on the temperature in the exhaust system. Further, a person skilled in the art will realise that the principles in the above two described embodiments may be combined.

The present invention may be implemented in a control system comprising, for example, a control device arranged to control the entire driveline or parts of the driveline in a motor vehicle 100. Further, the system may comprise additional control devices arranged to control other functions such as external loads, external heaters, etc. Control devices of the type displayed are normally arranged to receive sensor signals from different parts of the vehicle as well as from other control devices. These control devices are also usually arranged to emit control signals to different vehicle parts and vehicle components. The control devices may also comprise, or be connected to, a calculation device arranged for the calculation/simulation of predicted parameter values.

Generally, control systems in modern vehicles consist of a communications bus system consisting of one or several communications buses for the connection of a number of electronic control devices (ECUs) or controllers 115, 208 and different components arranged on the vehicle. Such a control system may comprise a large number of control devices, and the responsibility for a specific function in the vehicle may be distributed among one or more control devices.

Figure 4:
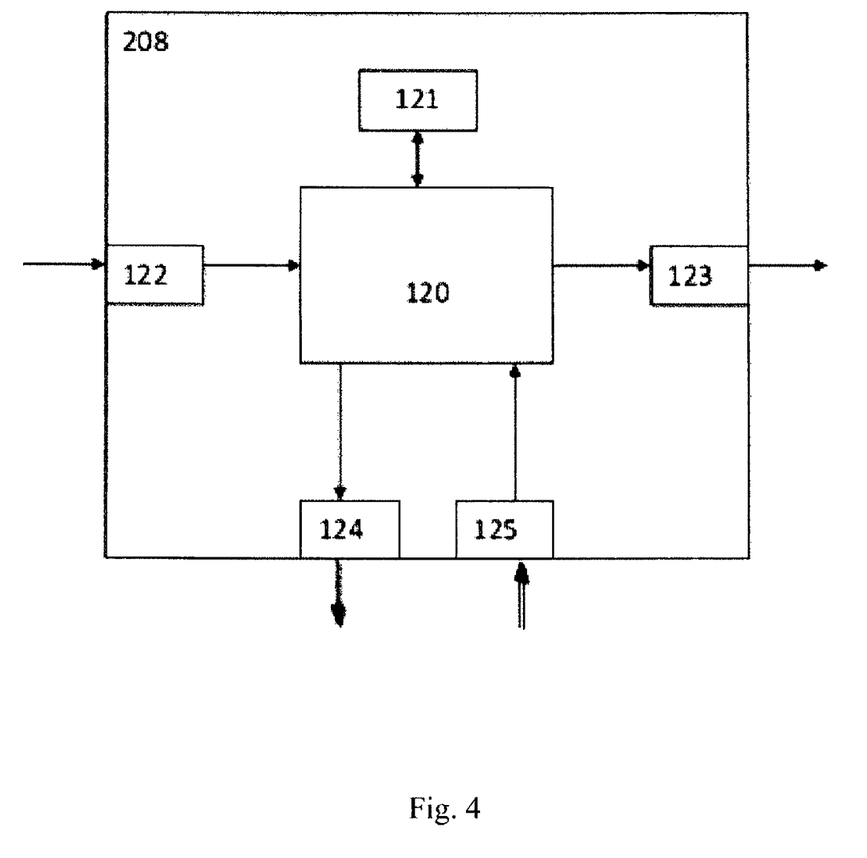
FIG. 4 is a schematic diagram of a control device.

The control usually takes place with programmed instructions. These programmed instructions typically consist of a computer program, which, when it is executed in a computer or control device, causes the computer/control device to carry out the desired control, such as methods according to the present invention. The computer program usually consists of a computer program product, where the computer program product comprises an applicable storage medium 121 with the computer program 109 stored on the storage medium 121. The digital storage medium 121 may e.g. consist of any from the following group: ROM (Read-Only Memory), PROM (Programmable Read-Only Memory), EPROM (Erasable PROM), Flash, EEPROM (Electrically Erasable PROM), a hard disk unit, etc., and may be set up in or in combination with the control device, where the computer program is executed by the control device.

An example control device (control device 208) is displayed in the diagram in FIG. 4, and the control device in turn may comprise a calculation device 120, which may consist of e.g. a suitable type of processor or microcomputer, e.g. a circuit for digital signal processing (Digital Signal Processor, DSP), or a circuit with a predetermined specific function (Application Specific Integrated Circuit, ASIC). The calculation device 120 is connected to a memory device 121, which provides the calculation device with e.g. the stored program code 109 and/or the stored data which the calculation device needs in order to be able to carry out calculations. The calculation device is also arranged to store interim or final results of calculations in the memory device 121.

Further, the control device is equipped with elements/devices 122, 123, 124, 125 for receipt and sending of input and output signals, respectively. These input and output signals may contain waveforms, pulses, or other attributes, which may be detected by the devices for the receipt of input signals as information for processing by the calculation device 120. The devices 123, 124 for sending output signals are arranged to convert the calculation result from the calculation unit 120 to output signals for transfer to other parts of the vehicle's control system and/or the component(s) for which the signals are intended. Each one of the connections to the devices for receipt and sending of input and output signals may consist of one or several of cables;

a data bus, such as a CAN (Controller Area Network) bus, a MOST (Media Oriented Systems Transport), or any other bus suitable configuration; or of a wireless communications connection.

More specifically, a (control) system according to the present invention comprises: obtaining one or several first parameters $P_1$, where at least one of the one or several first parameters $P_1$ is a first temperature difference between a first temperature $T_1$ in the exhaust system and a reference temperature $T_{Ref}$; and a control device arranged to downshift to a lower gear, and thus an increase of an engine speed and a reduction of a load on the combustion engine, if a value for the one or several first parameters $P_1$ exceeds a first threshold, and an upshift to a higher gear, and thus a reduction of an engine speed and an increase of a load of the combustion engine, if a value for the one or several first parameters $P_1$ is below a second threshold value.

Finally, it should be realised that the present invention is not limited to the embodiments of the invention described above, but pertains to and comprises all embodiments within the protected scope of the enclosed independent claims.

The invention claimed is:

1. A method for regulating a temperature in an exhaust stream in a motor vehicle through control of a driveline of the vehicle;
    the motor vehicle comprises: a driveline comprising a combustion engine connected to a gearbox, wherein the gearbox has several discrete gears, and an exhaust system arranged for the removal of an exhaust stream from the combustion engine;
    wherein the method comprises the steps:
    obtaining one or several first parameters $P_1$, where at least one of the one or several first parameters $P_1$ is a first temperature difference between a first temperature $T_1$ in the exhaust system and a reference temperature $T_{ref}$, and calculated over the road section ahead of the motor vehicle and based on one or several vehicle-specific and/or road-specific data for the motor vehicle; and
    controlling the gearbox, and thus controlling an operating point in the combustion engine through
    a downshift to a lower gear for increasing an engine speed and reducing a load on the combustion engine, if a value of the first temperature difference exceeds a first threshold value; and
    an upshift to a higher gear for reducing the engine speed and increasing the load on the combustion engine, if a value of the first temperature difference is below a second threshold value.

2. A method according to claim 1, further comprising at least one another of the one or several first parameters $P_1$ is an another first temperature $T_1$, or is a second temperature difference between the another first temperature $T_1$ and a second temperature $T_2$ in the exhaust system.

3. A method according to claim 2, wherein at least one another of the one or several first parameters $P_1$ is a time derivative or a time integral of the first temperature $T_1$ or the another first temperature $T_1$ or the first temperature difference and/or the second temperature difference.

4. A method according to claim 2, wherein the another first temperature $T_1$ is a temperature in the exhaust stream and the second temperature $T_2$ is a surface, liquid or substrate temperature in the exhaust system.

5. A method according to claim 1, wherein the vehicle-specific and/or road-specific data are selected from the group comprising: a road inclination, curve radii, speed limits; a weight of the motor vehicle; a rolling resistance; an air resistance; and engine specific data including at least one of maximum output, minimum output, maximum torque, minimum torque, exhaust flow, exhaust recirculation content, lambda values, and injection parameters.

6. A method according to claim 1, wherein the controlling further comprises:
    calculating at least one operating point in the combustion engine based on the one or several first parameters $P_1$; and
    controlling the gears in the gearbox based on the operating point.

7. A method according to claim 6, where the operating point is achieved with regard to a speed of the motor vehicle and the gears available in the gearbox.

8. A method according to claim 7, wherein the speed is any of: a current speed, a desired speed or a calculated speed.

9. A method according to claim 6, wherein the calculation of the operating point is also based on one or several additional parameters related to at least one selected from the group comprising: a requested drive power requirement, efficiency of the driveline, efficiency of an exhaust treatment system installed in the exhaust system, exhaust emissions from the combustion engine, a torque response, and driveability aspects.

10. A method according to claim 6, wherein the calculation of the operating point is also based on one or several additional parameters related to at least one external load selected from the group comprising: auxiliaries, a water pump, a fan or a compressor; a generator; a hybrid generator, an energy recycling system; a retarder, an exhaust brake or another auxiliary brake.

11. A method according to claim 10, wherein the external load is increased if the temperature $T_{Ex}$ in the exhaust system is to be increased.

12. A method according to claim 6, further comprises the step:
    controlling a speed for the motor vehicle based on the operating point.

13. A method according to claim 12, further comprising the vehicle engine has a cruise control; and
    controlling the speed is achieved through use of at least one speed offset value added to or subtracted from a reference value of the cruise control.

14. A method according to claim 1, further comprising:
    controlling a system configured for conversion of exhaust heat into energy (WHR) based on the one or several first parameters $P_1$ for regulating the temperature $T_{Ex}$ in the exhaust system.

15. A method according to claim 14, further comprising installing the system configured for the conversion of exhaust heat into energy (WHR) upstream of an area in the exhaust system in which a temperature is desired to be obtained; and the system configured for the conversion of exhaust heat into energy (WHR) is controlled so that it operates in a normal mode if the temperature $T_{Ex}$ in the exhaust system is to be reduced, and operates in an opposite mode if the temperature $T_{Ex}$ in the exhaust system is to be increased.

16. A method according to claim 1, further comprising:
    controlling at least one external heater based on the one or several first parameters $P_1$ for reducing or increasing the concentration/fraction $T_{Ex}$ in the exhaust system.

17. A method according to claim 16, wherein the external heater is one selected from the group comprising: a burner installed in the exhaust system after the combustion engine's cylinders; a system configured for injecting hydrocarbons for oxidation or combustion on a catalyst placed in the exhaust system;

an electric heater installed in the exhaust system after the exhaust passes from combustion engine's cylinders; and another external heater installed in or in close connection to the exhaust system.

18. A method according to claim 1, further comprising: controlling a fuel injection system configured for injection of fuel to the combustion engine based on the one or several first parameters $P_1$ for regulation of the temperature $T_{Ex}$ in the exhaust system.

19. A method according to claim 1, further comprising: controlling an exhaust flow in the exhaust stream, or controlling a parameter dependent on the exhaust flow based on the one or several first parameters $P_1$ for regulation of the temperature $T_{Ex}$ in the exhaust system.

20. A method according to claim 19, wherein controlling of the exhaust flow comprises:

controlling a gas flow system for exhaust gas recirculation (EGR) configured for the combustion engine and based on the one or several parameters $P_1$ for regulation of the temperature $T_{Ex}$ in the exhaust system; and/or controlling an intake system configured for regulation of an air flow into the combustion engine based on the one or several first parameters $P_1$ for regulation of the temperature $T_{Ex}$ in the exhaust system.

21. A method according to claim 20, further comprising the controlling of the gas flow system for exhaust gas recirculation (EGR) and/or control of the intake system is also based on one or several additional parameters related to a transferred output to a component installed in the exhaust system and/or emissions produced by the combustion engine.

22. A method according to claim 19, wherein the parameter dependent on the exhaust flow is heat transfer coefficient.

23. A method according to claim 1, wherein the reference temperature $T_{Ref}$ is one of a temperature in a component of the exhaust system, a temperature of a liquid injected in the exhaust system, or a temperature of a component installed in connection with the exhaust system.

24. A computer program product including a computer readable medium and a computer program, the computer program is included in the computer readable medium, the program comprises program code which, when the program code is executed in a computer, causes the computer to execute the method according to claim 1.

25. A system for controlling one or several functions in a motor vehicle, wherein the motor vehicle comprises: a driveline comprising a combustion engine connected to a gearbox, wherein the gearbox has several discrete gears, and an exhaust system arranged for removal of an exhaust stream from the combustion engine;

a receiving device configured to receive one or several first parameters $P_1$, wherein at least one of the one or several first parameters $P_1$ is a first temperature difference between a first temperature $T_1$ in the exhaust system and a reference temperature $T_{Ref}$, and is calculated over a road section ahead of the motor vehicle based on one or several vehicle-specific and/or road-specific data for the motor vehicle; and a control device arranged to downshift to a lower gear, and thus increase the engine speed and reduce the load on the combustion engine, if a value of the first temperature difference exceeds a first threshold value, and to upshift to a higher gear, and thus reduce the engine speed and increase the load on the combustion engine, if a value of the first temperature difference is below a second threshold value.

26. A motor vehicle comprising at least one system according to claim 25.

* * * * *

UNITED STATES PATENT AND TRADEMARK OFFICE
CERTIFICATE OF CORRECTION

PATENT NO. : 9,657,667 B2
APPLICATION NO. : 14/433274
DATED : May 23, 2017
INVENTOR(S) : Ola Stenlååås and Fredrik Roos It is certified that error appears in the above-identified patent and that said Letters Patent is hereby corrected as shown below:

On the Title Page

Insert item (30):
-- (30) Foreign Application Priority Data
October 2, 2012 (SE) ...................... 1251102-8
October 2, 2013 (SE) ...................... 1351152-2 --

Signed and Sealed this
Twentieth Day of February, 2018

Andrei Iancu
*Director of the United States Patent and Trademark Office*